United States Patent
Chang et al.

(10) Patent No.: US 12,338,593 B2
(45) Date of Patent: Jun. 24, 2025

(54) ADJUSTABLE PLATFORM FOR INSTALLING WIND TURBINE GENERATOR

(71) Applicant: Huaneng Shanxi Comprehensive Energy Co. Ltd., Shanxi (CN)

(72) Inventors: Yamin Chang, Shanxi (CN); Yong Chen, Shanxi (CN); Zhuanghua Zhu, Shanxi (CN); Jianhua Liu, Shanxi (CN); Yanjun Chen, Shanxi (CN)

(73) Assignee: Huaneng Shanxi Comprehensive Energy Co. Ltd., Taiyuan (CN)

( * ) Notice: Subject to any disclaimer, the term of this patent is extended or adjusted under 35 U.S.C. 154(b) by 179 days.

(21) Appl. No.: 18/454,814

(22) Filed: Aug. 24, 2023

(65) Prior Publication Data
US 2024/0026624 A1    Jan. 25, 2024

Related U.S. Application Data

(63) Continuation of application No. PCT/CN2022/128838, filed on Nov. 1, 2022.

(30) Foreign Application Priority Data

Jul. 21, 2022   (CN) .......................... 202210856309.5

(51) Int. Cl.
*E02B 17/04* (2006.01)
*E02B 17/02* (2006.01)
(Continued)

(52) U.S. Cl.
CPC ............ *E02B 17/02* (2013.01); *F03D 13/126* (2023.08); *E02B 2017/0047* (2013.01);
(Continued)

(58) Field of Classification Search
CPC ............ E02B 17/02; E02B 2017/0047; E02B 2017/0073; E02B 2017/0091; F03D 12/126; F05B 2240/915; F05B 2240/95
See application file for complete search history.

(56) References Cited

U.S. PATENT DOCUMENTS

| | | | |
|---|---|---|---|
| 11,168,666 B1 * | 11/2021 | van Loon | F03D 13/40 |
| 2011/0126748 A1 * | 6/2011 | Wu | F03D 13/40 |
| | | | 254/133 R |

(Continued)

FOREIGN PATENT DOCUMENTS

| | | |
|---|---|---|
| CN | 203346861 U | 12/2013 |
| CN | 104806455 A | 7/2015 |

(Continued)

*Primary Examiner* — Benjamin F Fiorello

(57) ABSTRACT

An adjustable platform for installing a wind turbine generator comprises an adjustable platform shell, the adjustable platform shell is installed on a hull, pile legs are connected vertically in the adjustable platform shell in a sliding way, a plurality of adjusting jacks are arranged on the pile legs, an electric plug-in component is arranged in the adjustable platform shell and used for fitting with the adjusting jacks. The fitting of electric plug-in component with the adjusting jacks of the pile legs replaces the bolted connection between the installation platform and the pile legs, and the electric power is used to replace the manual operation, solving the technical problems in the prior art that bolted connection is required between the installation platform and the pile legs, bolts are required to be removed manually before the pile legs sink, and the labor cost is greatly consumed.

9 Claims, 3 Drawing Sheets

(51) Int. Cl.
*F03D 13/10* (2016.01)
*F03D 13/25* (2016.01)
*E02B 17/00* (2006.01)

(52) U.S. Cl.
CPC .............. *E02B 2017/0073* (2013.01); *E02B 2017/0091* (2013.01); *F05B 2240/915* (2013.01); *F05B 2240/95* (2013.01)

(56) References Cited

U.S. PATENT DOCUMENTS

| | | | |
|---|---|---|---|
| 2015/0086275 A1* | 3/2015 | Vu | E02B 17/021 405/199 |
| 2015/0361965 A1* | 12/2015 | Jimeno Chueca | E02D 27/16 405/200 |
| 2018/0045179 A1* | 2/2018 | Hong | F03D 7/0204 |
| 2019/0264655 A1* | 8/2019 | Maini | E02B 17/021 |
| 2020/0032830 A1 | 1/2020 | Hudson et al. | |

FOREIGN PATENT DOCUMENTS

| | | |
|---|---|---|
| CN | 107642103 A | 1/2018 |
| CN | 107700450 A | 2/2018 |
| CN | 108163152 A | 6/2018 |
| CN | 209293001 U | 8/2019 |
| CN | 110606169 A | 12/2019 |
| CN | 111910576 A | 11/2020 |
| CN | 112141283 A | 12/2020 |
| CN | 214875457 U | 11/2021 |
| CN | 216508927 U | 5/2022 |
| CN | 216554214 U | 5/2022 |
| CN | 114922153 A | 8/2022 |
| EP | 0352204 A1 | 1/1990 |
| FR | 2723975 B1 | 2/1997 |
| GB | 1449216 A | 9/1976 |
| JP | 2004027548 A | 1/2004 |

* cited by examiner

ADJUSTABLE PLATFORM FOR INSTALLING WIND TURBINE GENERATOR

CROSS-REFERENCE TO RELATED APPLICATIONS

This application is a continuation of PCT/CN2022/128838, filed on Nov. 1, 2022 and claims priority of Chinese Patent Application No. 202210856309.5, filed on Jul. 21, 2022, the entire contents of which are incorporated herein by reference.

TECHNICAL FIELD

The invention relates to the technical field of wind turbine generators, in particular to an adjustable platform for installing a wind turbine generator.

BACKGROUND ART

Wind resources are inexhaustible. The wind power generation can reduce environmental pollution, save coal, oil, and other conventional energy. The wind power technology is mature and relatively low-cost in the renewable energy sources, having broad prospects for development. The basic principle of wind power generation is to convert the kinetic energy of the wind into the mechanical energy through the wind turbine, and then drive the wind turbine generator to convert the mechanical energy into the electric energy. It is necessary to use the corresponding installation platform for installation of the wind turbine generator;

Chinese Patent CN 107700450A discloses an installation process for a floating offshore wind turbine generator installation platform, the wind turbine generator installation platform is connected to the pile legs through bolts, which are required to be removed manually before sinking, and the labor costs are greatly consumed because of heavy pile legs and difficult disassembly.

CONTENT OF INVENTION

The invention provides an adjustable platform for installing a wind turbine generator to solve the technical problems in the prior art.

To solve the above technical problems, the invention discloses an adjustable platform for installing a wind turbine generator, which comprises an adjustable platform shell, wherein the adjustable platform shell is installed on a hull, pile legs are connected vertically in the adjustable platform shell in a sliding way, a plurality of adjusting jacks are arranged on the pile legs, an electric plug-in component is arranged in the adjustable platform shell and used for fitting with the adjusting jacks.

Preferably, the electric plug-in component comprises:
A plug-in adjusting gear, which is rotationally connected in the adjustable platform shell, and a first drive part is arranged on the plug-in adjusting gear and used to drive the plug-in adjusting gear to rotate;
Two plug-in racks arranged vertically, the plug-in racks are connected to the inner wall of the adjustable platform shell in a sliding way, two sides of the plug-in adjusting gear are respectively meshed with the plug-in racks, and one end of the plug-in racks away from the plug-in adjusting gear is used for plugging in the adjusting jacks.

Preferably, a guide slide block is arranged on the plug-in rack and is connected to the inner wall of the adjustable platform shell in a sliding way.

Preferably, the adjustable platform also comprises:
A lifting adjusting gear, which is rotationally connected in the adjustable platform shell, and a second drive part is arranged on the lifting adjusting gear and is used to drive the lifting adjusting gear to rotate;
Lifting adjusting teeth, which are arranged on the outer wall of the pile leg, and the lifting adjusting gear is meshed with the lifting adjusting teeth.

Preferably, the adjustable platform shell is connected to the hull through a buffer component.

Preferably, the buffer component comprises:
A guide rod mounting rack, which is fixedly connected to the hull;
A guide rod, which is fixedly connected to the guide rod mounting rack;
Two symmetrical buffer execution components, the top of which is connected to the adjustable platform shell, and the bottom of which is connected to the hull.

Preferably, the buffer execution component 402 comprises:
Two symmetrical guide sleeves, which are connected to the guide rod in a sliding way, and an elastic buffer part is arranged between the two guide sleeves on the guide rod;
An upper linkage, which comprises a first connecting rod and a second connecting rod, the first connecting rod and the second connecting rod are respectively hinged at the upper ends of the two guide sleeves, one end of the first connecting rod and the second connecting rod away from the guide sleeve is hinged on a connecting plate and the connecting plate is connected to the adjustable platform shell (1) through a bolt;
A lower linkage which comprises a third connecting rod and a fourth connecting rod, and the third connecting rod and the fourth connecting rod re respectively hinged at the lower ends of the two guide sleeves, one end of the third connecting rod and the fourth connecting rod away from the guide sleeve is hinged on a connecting block, and the connecting block is fixed on the hull. Preferably, the adjustable platform also comprises a pile leg auxiliary mounting plug (5), a threaded connecting hole (500) is arranged on the pile leg auxiliary mounting plug (5), and the pile leg auxiliary mounting plug (5) is connected to the pile leg (3) through the threaded connecting hole (500);
The pile leg auxiliary mounting plug comprises a driving component, a first firm component and a second firm component, and the driving component is used to drive the first firm component and the second firm component to work;
The driving component comprises:
A main drive gear, a plurality of first meshing teeth are arranged on the main drive gear, the main drive gear is radially connected to a pushing block along the radial direction in a sliding way, the pushing block is connected to the main drive gear through a first elastic reset part, and a third drive part is arranged on the main drive gear and is used to drive the main drive gear to rotate; The first firm component comprises:
A mounting cylinder, which is fixedly connected in the pile leg auxiliary mounting plug; 1A drive piston, which is connected in the mounting cylinder in a sliding way, a plurality of pushing grooves are arranged at one end of the drive piston located outside the mounting cylinder, the pushing block is used to fit with the pushing grooves, a short rod is fixedly connected at one end of the drive piston located inside the mounting cylinder, a first electromagnet is arranged on the drive piston, and a second electromagnet is arranged on the inner wall of the mounting cylinder and is used to absorb the first electromagnet;

A threaded stud, which is rotationally connected in the mounting cylinder, a fit thread is arranged on the threaded stud, and one end of the short rod away from the drive piston is connected in the fit thread in a sliding way;

A threaded rod, which is fixedly connected to the threaded stud, and a firm drill bit is sleeved outside the threaded rod, and the threaded connection is adopted between the firm drill bit and the threaded rod;

The second firm component comprises:

A rack guide base, which is fixedly connected on the mounting cylinder;

A meshing rack, which is connected on the rack guide base in a sliding way, a plurality of groups of second meshing teeth are arranged on the meshing rack (5014), and the second meshing teeth are used to mesh with the first meshing teeth;

A reset elastic part mounting base, which is fixedly connected to the meshing rack, and a second reset elastic part mounting base is fixedly connected between the reset elastic part mounting base and the rack guide base;

A positioning part, which is connected in the pile leg auxiliary mounting plug in a sliding way;

A power transmission part, which is rotationally connected in the pile leg auxiliary mounting plug, one side of the power transmission part is used to fit with one end of the meshing rack away from the second meshing teeth, and the other side of the power transmission part is used to hammer the positioning part.

Preferably, the adjustable platform also comprises a firm drill bit cleaning component, which comprises:

A water injection cylinder body, which is fixedly connected on the mounting cylinder body, a water inlet is arranged on the water injection cylinder body, and a check valve is arranged on the water inlet;

A pulling plunger, which is connected in the water injection cylinder body in a sliding way, a connecting plate is fixedly connected at one end of the pulling plunger located outside the water injection cylinder body, one end of the connecting plate away from the pulling plunger is fixedly connected on the meshing rack, a guide column is fixedly connected to the connecting plate, and one end of the guide column away from the connecting plate is connected in the rack guide base in a sliding way;

A flushing spray gun, which is hinged on the mounting cylinder, the inlet end of the flushing spray gun is connected to the water injection cylinder body through an outlet pipe, and the outlet end of the flushing spray gun is oriented towards the firm drill bit (5012).

Preferably, a wind turbine generator mounting assembly is arranged on the adjustable platform shell, is used for the installation of a wind turbine generator, and comprises:

Two symmetrical lifting screw rods, which are rotationally connected to the adjustable platform shell, and a bearing table is connected to the lifting screw rod (600) though threads;

A drive motor, which is fixedly connected to the adjustable platform shell, a first belt wheel and a second belt wheel are connected to the output end of the drive motor, a third belt wheel and a fourth belt wheel are respectively connected to the two lifting screw rods, the first belt wheel and the third belt wheel are connected through a first conveyor belt, and the second belt wheel and the fourth belt wheel are connected through a second conveyor belt;

A fixed curved plate, which is fixedly connected to the bearing table;

An adjustable curved plate, the wind turbine generator is installed between the fixed curved plate and the adjustable curved plate, a T-rod is fixedly connected to the adjustable curved plate and is connected in a first hydraulic cylinder in a sliding way, and the first hydraulic cylinder is fixedly connected to the bearing table through a cylinder mounting support;

A second hydraulic cylinder, which is fixedly connected to the bearing table, an adjusting lead screw is rotationally connected in the second hydraulic cylinder a fourth drive part is arranged on the adjusting lead screw and is used to drive the adjusting lead screw to rotate, an extrusion nut is connected to the adjusting lead screw through threads, hydraulic oil is provided in the second hydraulic cylinder, and the second hydraulic cylinder is connected to the first hydraulic cylinder through a hydraulic oil connecting pipe;

A reel motor, which is fixedly connected to the bearing table, an output shaft key of the reel motor is connected to a first reel and a second reel, and wires are wound on the first reel and the second reel;

Two symmetrical hammering racks, which are connected to the bearing table in a sliding way, a circular table is fixedly connected to the hammering racks, a rack reset elastic part is fixedly connected to the circular table, and one end of the rack reset elastic part away from the circular table is propped against the bearing table;

Fixing wheels, which are fixedly connected at one end of the hammering rack located below the bearing table, and one end of the wire away from the first reel and the second reel is respectively fixed on the two fixing wheels;

A hammering gear and a hammering cam, which are coaxially and rotationally connected to the bearing table, and the hammering gear is meshed with the hammering racks.

The technical proposal of the invention is further described below in detail by the drawings and the embodiments.

DESCRIPTION OF DRAWINGS

The drawings are used to provide a further understanding of the invention, form part of the specification. They are used to explain the invention together with the embodiments of the invention, and do not constitute a restriction to the invention. In the drawings.

EMBODIMENTS

The preferred embodiments of the invention are illustrated below in combination with the drawings. Understandably, the preferred embodiments described herein are used only to illustrate and explain the invention, but not to limit the invention.

In addition, descriptions in the invention, such as "first" and "second", are used only for descriptive purposes, do not specifically refer to the meaning of order or sequence, are not used to limit the invention but are used to distinguish components or operations described in the same technical terms, and cannot be understood to indicate or imply their relative importance or implicitly suggest the quantity of technical features indicated. Thus, features defined as "first" or "second" may explicitly or implicitly include at least one of the features. In addition, the technical proposals and technical features among the embodiments can be combined with each other on the premise that ordinary technicians in the field can realize. When the combination of technical proposals contradicts each other or cannot be realized, it shall be considered that such combination of technical proposals does not exist and is not within the scope of protection of the invention.

The invention provides the following embodiments:

Embodiment 1

Figure 1:
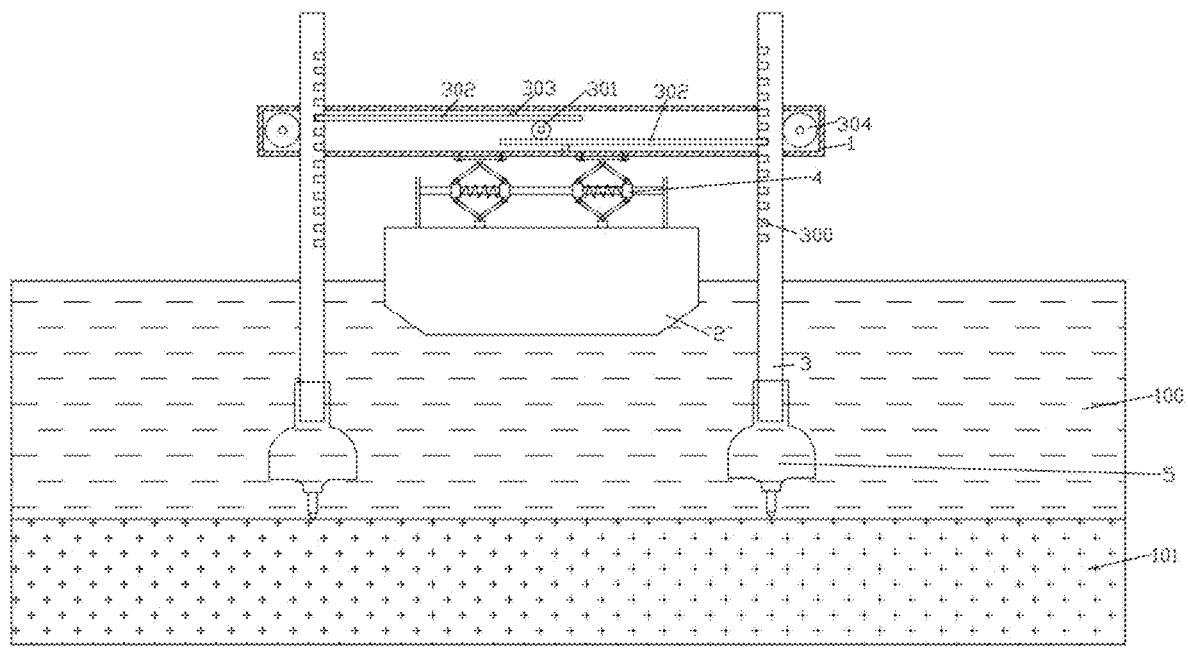
FIG. 1 is the schematic diagram for the overall structure of the invention.
Figure 2:
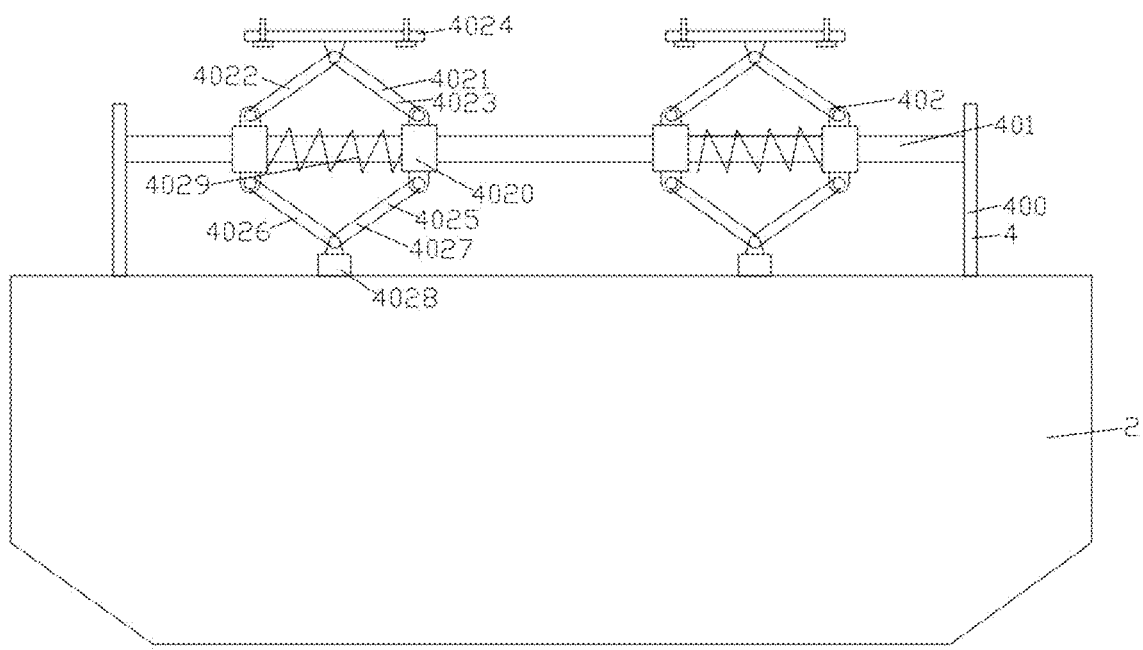
FIG. 2 is the structure diagram for the buffer component of the invention.
Figure 3:
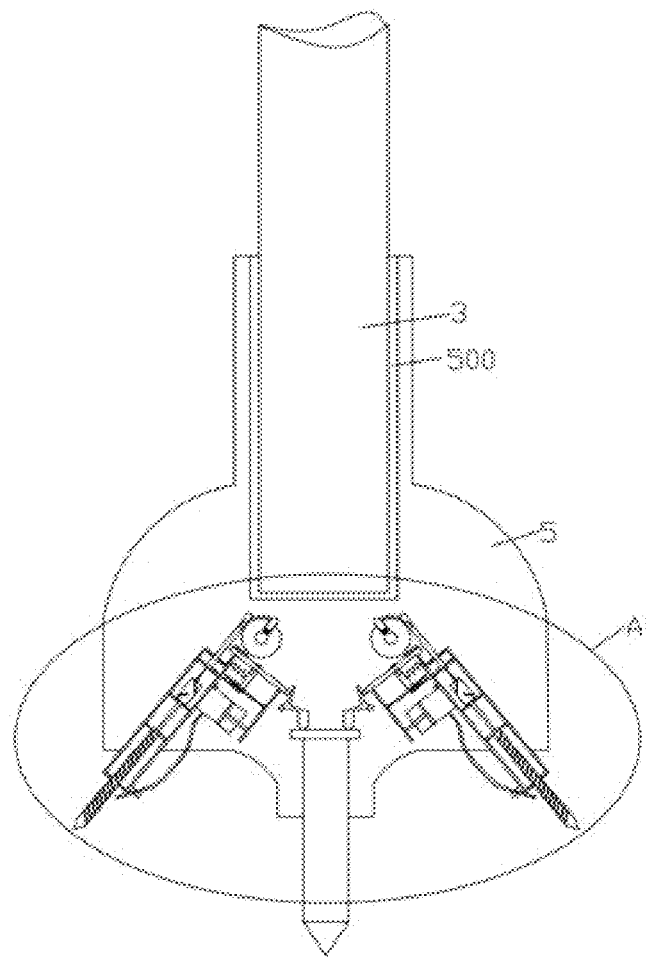
FIG. 3 is the structure diagram for the pile leg auxiliary mounting plug of the invention.
Figure 4:
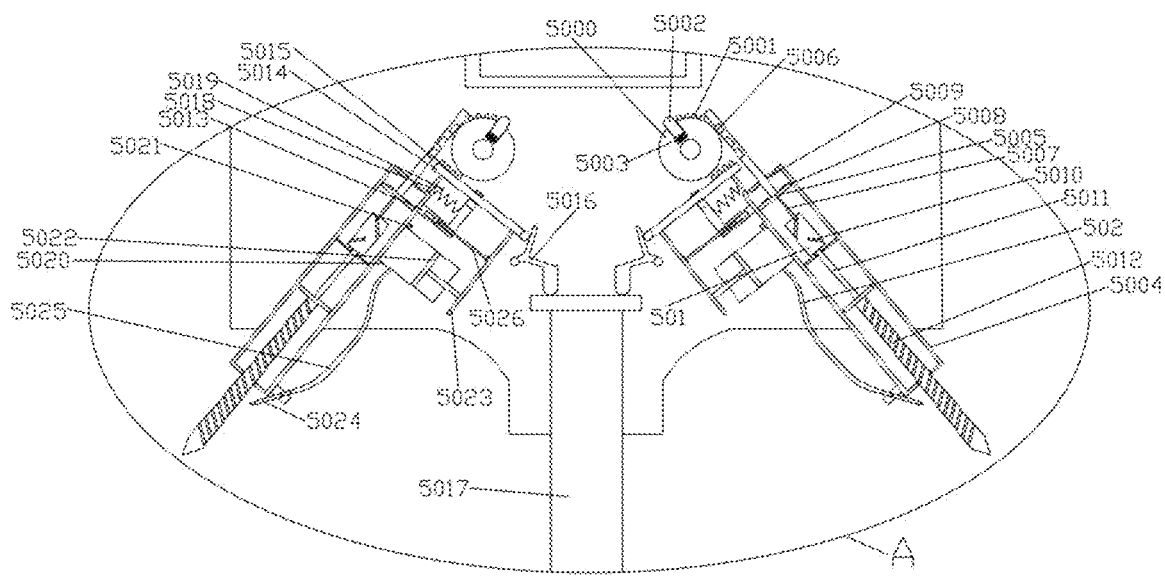
FIG. 4 is the partial enlarged detail at A of FIG. 3 in the invention.
Figure 5:
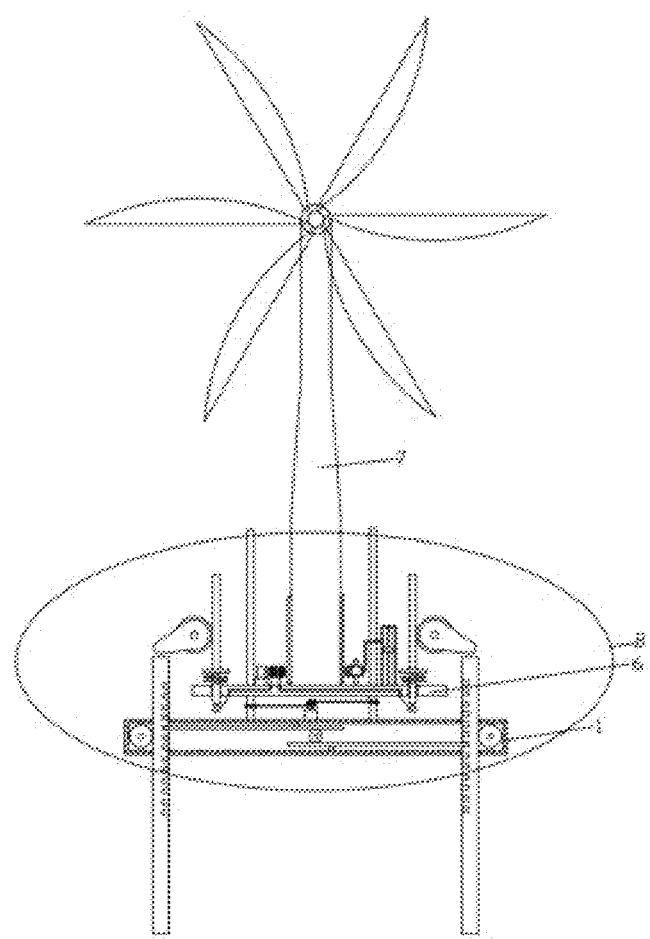
FIG. 5 is the installation structure diagram for the wind turbine generator of the invention.
Figure 6:
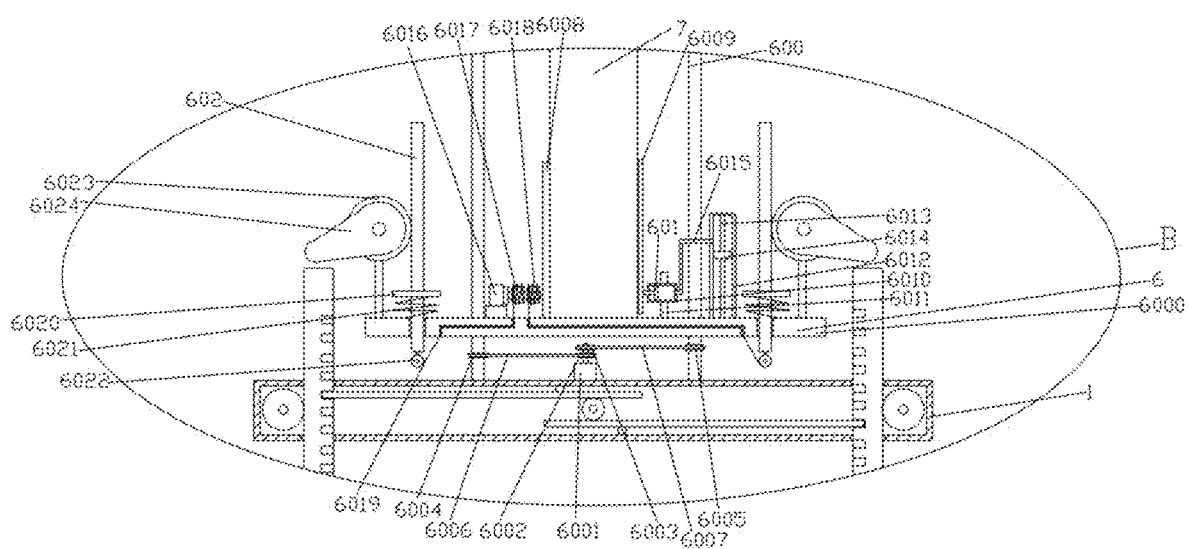
FIG. 6 is the partial enlarged detail at B of FIG. 5 in the invention.

The embodiment of the invention provides an adjustable platform for installing a wind turbine generator, as shown in FIG. 1 to FIG. 6, which comprises an adjustable platform shell 1, wherein the adjustable platform shell 1 is installed on a hull 2, pile legs 3 are connected vertically in the adjustable platform shell 1 in a sliding way, a plurality of adjusting jacks 300 are arranged on the pile legs 3, an electric plug-in component is arranged in the adjustable platform shell 1 and used for fitting with the adjusting jacks 300.

The technical proposal has the following operating principle and beneficial effects: During operation, the adjustable platform can be transported to the installation location of the wind turbine generator by the hull 2, the electric plug-in component is detached from the adjusting jack 300, so that pile legs 3 sink downward under the action of the dead load and are plugged in a silt area 101 through a seawater area 100, then the electric plug-in component is plugged in the adjusting jack 300, and the adjustable platform shell 1 and the hull 2 are separated from the installation state, and the hull 2 sinks and drives out of the installation area of the pile legs 3. At this point, the installation of the adjustable platform is completed (as the wind turbine generator is installed on the adjustable platform, the adjustable platform plays a role of installing the wind turbine generator on the sea);

In the invention, the fitting of electric plug-in component with the adjusting jacks 300 of the pile legs 3 replaces the bolted connection between the installation platform and the pile legs, and the electric power is used to replace the manual operation, solving the technical problems in the prior art that bolted connection is required between the installation platform and the pile legs of the wind turbine generator installation platform, bolts are required to be removed manually before the pile legs sink, and the labor cost is greatly consumed.

Embodiment 2

Based on the embodiment 1, the electric plug-in component comprises:

A plug-in adjusting gear 301, which is rotationally connected in the adjustable platform shell 1, and a first drive part is arranged on the plug-in adjusting gear 301 and used to drive the plug-in adjusting gear 301 to rotate;

Two plug-in racks 302 arranged vertically, the plug-in racks are connected to the inner wall of the adjustable platform shell 1 in a sliding way, two sides of the plug-in adjusting gear 301 are respectively meshed with the plug-in racks 302, and one end of the plug-in racks 302 away from the plug-in adjusting gear 301 is used for plugging in the adjusting jacks 300;

A guide slide block 303 is arranged on the plug-in rack 302 and is connected to the inner wall of the adjustable platform shell 1 in a sliding way;

The adjustable platform also comprises:

A lifting adjusting gear 304, which is rotationally connected in the adjustable platform shell 1, and a second drive part is arranged on the lifting adjusting gear 304 and is used to drive the lifting adjusting gear 304 to rotate;

Lifting adjusting teeth, which are arranged on the outer wall of the pile leg 3, and the lifting adjusting gear 304 is meshed with the lifting adjusting teeth.

The technical proposal has the following operating principle and beneficial effects: When the electric plug-in component is in use, the first drive part drives the plug-in adjusting gear 301 to rotate, the plug-in adjusting gear 301 rotates to drive the plug-in rack 302 to slide along the inner wall of the adjustable platform shell 1, and the plug-in rack 302 slides to realize the fit and disengagement between the plug-in rack 302 and the adjusting jack 300; a guide sliding block 303 is designed to make the movement of the plug-in rack 302 more stable and the movement trajectory more certain, increasing the plug-in accuracy of plug-in rack 302 and adjusting jack 300;

When the pile legs 3 are adjusted for lifting, the second drive part drives the lifting adjusting gear 304 to rotate, and the lifting adjusting gear 304 rotates and drives the pile legs 3 to move up and down under the action of the lifting adjusting teeth to realize the lifting of the pile legs 3.

Embodiment 3

Based on the embodiment 1 or 2, the adjustable platform shell 1 is connected to the hull 2 through a buffer component 4;

The buffer component 4 comprises:

A guide rod mounting rack 400, which is fixedly connected to the hull 2;

A guide rod 401, which is fixedly connected to the guide rod mounting rack 400;

Two symmetrical buffer execution components 402, the top of which is connected to the adjustable platform shell 1, and the bottom of which is connected to the hull 2;

The buffer execution component 402 comprises:

Two symmetrical guide sleeves 4020, which are connected to the guide rod 401 in a sliding way, and an elastic buffer part 4029 is arranged between the two guide sleeves 4020 on the guide rod 401;

An upper linkage 4021, which comprises a first connecting rod 4022 and a second connecting rod 4023, the first connecting rod 4022 and the second connecting rod 4023 are respectively hinged at the upper ends of the two guide sleeves 4020, one end of the first connecting rod 4022 and the second connecting rod 4023 away from the guide sleeve 4020 is hinged on a connecting plate 4024, and the connecting plate 4024 is connected to the adjustable platform shell 1 through a bolt;

A lower linkage 4025, which comprises a third connecting rod 4026 and a fourth connecting rod 4027, and the third connecting rod 4026 and the fourth connecting rod 4027 are respectively hinged at the lower ends of the two guide sleeves 4020, one end of the third connecting rod 4026 and the fourth connecting rod 4027 away from the guide sleeve 4020 is hinged on a connecting block 4028, and the connecting block 4028 is fixed on the hull 2.

The technical proposal has the following operating principle and beneficial effects: The adjustable platform shell 1 certainly vibrates due to the floating of hull 2 during operation or when the pile legs 3 are hammered by the hammer on the hull 2 and are plugged in the silt (refer to the prior art CN 107700450A for the operating mode); if adjustable platform shell 1 is directly connected to the hull 2, the service life of the hull 2 or adjustable platform is certainly shortened due to mutual impact;

When the adjustable platform shell 1 vibrates, the kinetic energy on the adjustable platform shell 1 is transferred to the first connecting rod 4022 and the second connecting rod 4023, which drive the guide sleeves 4020 to slide along the guide rod 401, and the guide sleeves 4020 slides to change the spacing between the two guide sleeves 4020 and drive the third connecting rod 4026 and the fourth connecting rod 4027 of the lower linkage 4025 to move, and finally the kinetic energy on the guide sleeves 4020 is converted into the elastic potential energy of the elastic buffer part 4029, thereby reducing the damage caused by the vibration of the adjustable platform shell 1 to the adjustable platform shell 1 and the hull 2.

Embodiment 4

Based on the embodiment 1, the adjustable platform also comprises a pile leg auxiliary mounting plug 5, a threaded connecting hole 500 is arranged on the pile leg auxiliary mounting plug 5, and the pile leg auxiliary mounting plug 5 is connected to the pile leg 3 through the threaded connecting hole 500;

The pile leg auxiliary mounting plug 5 comprises a driving component, a first firm component and a second firm component, and the driving component is used to drive the first firm component and the second firm component to work;

The driving component comprises:

A main drive gear 5000, a plurality of first meshing teeth 5001 are arranged on the main drive gear 5000, the main drive gear 5000 is radially connected to a pushing block 5002 along the radial direction in a sliding way, the pushing block 5002 is connected to the main drive gear 5000 through a first elastic reset part 5003, and a third drive part is arranged on the main drive gear 5000 and is used to drive the main drive gear 5000 to rotate;

The first firm component comprises:

A mounting cylinder 5004, which is fixedly connected in the pile leg auxiliary mounting plug 5;

A drive piston 5005, which is connected in the mounting cylinder 5004 in a sliding way, a plurality of pushing grooves 5006 are arranged at one end of the drive piston 5005 located outside the mounting cylinder 5004, the pushing block 5002 is used to fit with the pushing grooves 5006, a short rod 5007 is fixedly connected at one end of the drive piston 5005 located inside the mounting cylinder 5004, a first electromagnet 5008 is arranged on the drive piston 5005, and a second electromagnet 5009 is arranged on the inner wall of the mounting cylinder 5004 and is used to absorb the first electromagnet 5008;

A threaded stud 501, which is rotationally connected in the mounting cylinder 5004, a fit thread 5010 is arranged on the threaded stud 501, and one end of the short rod 5007 away from the drive piston 5005 is connected in the fit thread 5010 in a sliding way;

A threaded rod 5011, which is fixedly connected to the threaded stud 501, and a firm drill bit 5012 is sleeved outside the threaded rod 5011, and the threaded connection is adopted between the firm drill bit 5012 and the threaded rod 5011;

The second firm component comprises:

A rack guide base 5013, which is fixedly connected on the mounting cylinder 5004;

A meshing rack 5014, which is connected on the rack guide base 5013 in a sliding way, a plurality of groups of second meshing teeth 5015 are arranged on the meshing rack 5014, and the second meshing teeth 5015 are used to mesh with the first meshing teeth;

A reset elastic part mounting base 5018, which is fixedly connected to the meshing rack 5014, and a second reset elastic part mounting base 5019 is fixedly connected between the reset elastic part mounting base 5018 and the rack guide base 5013;

A positioning part 5017, which is connected in the pile leg auxiliary mounting plug 5 in a sliding way;

A power transmission part 5016, which is rotationally connected in the pile leg auxiliary mounting plug 5, one side of the power transmission part 5016 is used to fit with one end of the meshing rack 5014 away from the second meshing teeth 5015, and the other side of the power transmission part 5016 is used to hammer the positioning part 5017;

A firm drill bit cleaning component 502, which comprises:

A water injection cylinder body 5020, which is fixedly connected on the mounting cylinder body 5004, a water inlet 5021 is arranged on the water injection cylinder body 5020, and a check valve is arranged on the water inlet 5021;

A pulling plunger 5022, which is connected in the water injection cylinder body 5020 in a sliding way, a connecting plate 5023 is fixedly connected at one end of the pulling plunger 5022 located outside the water injection cylinder body 5020, one end of the connecting plate 5023 away from the pulling plunger 5022 is fixedly connected on the meshing rack 5014, a guide column 5026 is fixedly connected to the connecting plate 5023, and one end of the guide column 5026 away from the connecting plate 5023 is connected in the rack guide base 5013 in a sliding way;

A flushing spray gun 5024, which is hinged on the mounting cylinder 5004, the inlet end of the flushing spray gun 5024 is connected to the water injection cylinder body 5020 through an outlet pipe 5025, and the outlet end of the flushing spray gun 5024 is oriented towards the firm drill bit 5012.

The technical proposal has the following operating principle and beneficial effects:

When the pile legs 3 are lowered above the silt area 101, the third drive part drives the main drive gear 5000 to rotate, and then the main drive gear 5000 rotates; when passing through the pushing groove 5006, the pushing block 5002 fits with the pushing groove 5006 to push the drive piston 5005 to slide in the direction away from the second electromagnet 5009 along the mounting cylinder 5004, so that the short rod 5007 slides along the fit thread 5010 of the threaded stud 501, the threaded stud 501 begins to rotate under the action of the fit thread 5010 and drive the threaded rod 5011 to rotate, the threaded rod 5011 drives the firm drill bit 5012 to rotate and extends to the silt area 101, the main drive gear 5000 rotates and drives the pushing block 5002 and the pushing groove 5006 for intermittent fit, finally the firm drill bit 5012 are inserted into the silt area 101; when drive piston 5005 is withdrawn, the first electromagnet 5008 and the second electromagnet 5009 are charged to make the drive piston 5005 return to the original position;

Meanwhile, the main drive gear 5000 rotates, so that the first meshing teeth 5001 and the second meshing teeth 5015 are meshed to drive the meshing rack 5014 to move in the direction away from the mounting cylinder 5004 along the rack guide base 5013; the meshing rack 5014 drives the power transmission part 5016 to rotate, so that the power transmission part 5016 knocks the positioning part 5017 and the positioning part 5017 moves to the silt area 101; the first meshing teeth 5001 and the second meshing teeth 5015 are intermittently meshed under the action of the second elastic reset part 5019 and the rotation of the main drive gear 5000, ensuring that the power transmission part 5016 continuously knocks the positioning part 5017, and finally the positioning part 5017 is inserted into the silt area 101;

When the firm drill bit 5012 is withdrawn after use, the connecting plate 5023 is driven to move due to the reciprocating sliding of the meshing rack 5014 along the rack guide base 5013, so that the pulling plunger 5022 is pulled in the water injection cylinder 5020, the seawater is injected the water injection cylinder 5020 through the water inlet 5021 during the pulling process, discharged from the water injection cylinder 5020 through the outlet pipe 5025 and then sprayed on the firm drill bit 5012 by the flushing spray gun 5024 to wash away the silt on the firm drill bit 5012, which is convenient for the next use of the firm drill bit 5012; as the threads on the firm drill bit 5012 play a role of guiding and discharging the silt around the firm drill bit 5012 to be discharged in the opposite direction to the inserting direction of the firm drill bit 5012 during insertion into the silt area 101, thereby increasing the smoothness of the firm drill bit 5012 during insertion into the silt; as the silt attached to the firm drill bit 5012 after use will increase the difficulty of inserting the firm drill bit 5012 into the silt during the next use, the design of the firm drill bit cleaning component 502 can greatly increase the smoothness of the firm drill bit 5012 during the next use.

Embodiment 5

Based on the embodiment 1, a wind turbine generator mounting assembly 6 is arranged on the adjustable platform shell 1, is used for the installation of a wind turbine generator 7, and comprises:

Two symmetrical lifting screw rods 600, which are rotationally connected to the adjustable platform shell 1, and a bearing table 6000 is connected to the lifting screw rod 600 though threads;

A drive motor 6001, which is fixedly connected to the adjustable platform shell 1, a first belt wheel 6002 and a second belt wheel 6003 are connected to the output end of the drive motor 6001, a third belt wheel 6004 and a fourth belt wheel 6005 are respectively connected to the two lifting screw rods 600, the first belt wheel 6002 and the third belt wheel 6004 are connected through a first conveyor belt 6006, and the second belt wheel 6003 and the fourth belt wheel 6005 are connected through a second conveyor belt 6007;

A fixed curved plate 6008, which is fixedly connected to the bearing table 6000;

An adjustable curved plate 6009, the wind turbine generator 7 is installed between the fixed curved plate 6008 and the adjustable curved plate 6009, a T-rod 601 is fixedly connected to the adjustable curved plate 6009 and is connected in a first hydraulic cylinder 6010 in a sliding way, and the first hydraulic cylinder 6010 is fixedly connected to the bearing table 6000 through a cylinder mounting support 6011;

A second hydraulic cylinder 6012, which is fixedly connected to the bearing table 6000, an adjusting lead screw 6013 is rotationally connected in the second hydraulic cylinder 6012, a fourth drive part is arranged on the adjusting lead screw 6013 and is used to drive the adjusting lead screw 6013 to rotate, an extrusion nut 6014 is connected to the adjusting lead screw 6013 through threads, hydraulic oil is provided in the second hydraulic cylinder 6012, and the second hydraulic cylinder 6012 is connected to the first hydraulic cylinder 6010 through a hydraulic oil connecting pipe 6015;

A reel motor 6016, which is fixedly connected to the bearing table 6000, an output shaft key of the reel motor 6016 is connected to a first reel 6017 and a second reel 6018, and wires are wound on the first reel 6017 and the second reel 6018;

Two symmetrical hammering racks 602, which are connected to the bearing table 6000 in a sliding way, a circular table 6020 is fixedly connected to the hammering racks 602, a rack reset elastic part 6021 is fixedly connected to the circular table 6020, and one end of the rack reset elastic part 6021 away from the circular table 6020 is propped against the bearing table 6000;

Fixing wheels 6022, which are fixedly connected at one end of the hammering rack 602 located below the bearing table 6000, and one end of the wire 6019 away from the first reel 6017 and the second reel 6018 is respectively fixed on the two fixing wheels 6022;

A hammering gear 6023 and a hammering cam 6024, which are coaxially and rotationally connected to the bearing table 6000, and the hammering gear 6023 is meshed with the hammering racks 6024.

The technical proposal has the following operating principle and beneficial effects: When the wind turbine generator 7 is fixed, the fourth drive part drives the adjusting lead screw 6013 to rotate, the extrusion nut 6014 is driven to move upward under the rotation of the adjusting lead screw 6013 and extrudes the hydraulic oil in the second hydraulic cylinder 6012, the hydraulic oil enters the first hydraulic cylinder 6010 through the hydraulic oil connecting pipe 6015 to extrude a T-shaped rod 601 and make the adjustable curved plate 6009 close to the outer wall of the wind turbine generator 7, and the adjustable curved plate 6009 is designed to enable the adjustable platform to adapt to the installation of wind turbine generators 7 of different sizes; the drive motor 6001 drives the first belt wheel 6002 and the second belt wheel 6003 to rotate, the lifting screw rod 600 is driven to rotate under the action of the first conveyor belt 6006 and the second conveyor belt 6007 to drive the bearing table 6000 to move up and down, so that the installation height of the wind turbine generator 7 can be manually adjusted; The wind turbine generator mounting component 6 can be used to knock the pile legs 3 during falling to speed up the falling speed of the pile legs 3 and increase the insertion depth; during operation, the reel motor 6016 drives the first reel 6017 and the second reel 6018 to rotate, and the wire 6019 between the first reel 6017 and the second reel 6018 is shortened, so that the fixing wheels 6022 pull the hammering rack 602 to move downwards, the hammering gear 6023 is driven by the downward movement of the hammering rack 602, so that the hammering cam 6024 rotates in the direction away from the pile legs 3, during which the rack reset elastic part 6021 is compressed and then restored to the original length to drive the hammering rack 602 to move upward, and then the hammering gear 6023 is driven by the upward movement of the hammering rack 602 to rotate, and the hammering gear 6023 drives the hammering cam 6024 to knock the pile legs 3, thereby accelerating the falling of the pile legs 3.

Obviously, the technicians in the field may make various alterations and variants to the invention without deviation from the spirit and scope of the invention. Thus, to the extent that these modifications and variations of the invention are within the scope of the claims of the invention and their equivalent technologies, the invention is also intended to include such modifications and variations.

The invention claimed is:
1. An adjustable platform for installing a wind turbine generator, characterized by comprising an adjustable platform shell (1), the adjustable platform shell (1) is installed on a hull (2), pile legs (3) are connected vertically in the adjustable platform shell (1) in a sliding way, a plurality of adjusting jacks (300) are arranged on the pile legs (1), an electric plug-in component is arranged in the adjustable platform shell (1) and used for fitting with the adjusting jacks (300);
  a wind turbine generator mounting assembly (6) is arranged on the adjustable platform shell (1), is used for the installation of a wind turbine generator (7), and comprises:
  two symmetrical lifting screw rods (600), which are rotationally connected to the adjustable platform shell (1), and a bearing table (6000) is connected to the lifting screw rod (600) though threads;
  a drive motor (6001), which is fixedly connected to the adjustable platform shell (1), a first belt wheel (6002) and a second belt wheel (6003) are connected to the output end of the drive motor (6001), a third belt wheel (6004) and a fourth belt wheel (6005) are respectively connected to the two lifting screw rods (600), the first belt wheel (6002) and the third belt wheel (6004) are connected through a first conveyor belt (6006), and the second belt wheel (6003) and the fourth belt wheel (6005) are connected through a second conveyor belt (6007);
  a fixed curved plate (6008), which is fixedly connected to the bearing table (6000);
  an adjustable curved plate (6009), the wind turbine generator (7) is installed between the fixed curved plate (6008) and the adjustable curved plate (6009), a T-rod (601) is fixedly connected to the adjustable curved plate (6009) and is connected in a first hydraulic cylinder (6010) in a sliding way, and the first hydraulic cylinder (6010) is fixedly connected to the bearing table (6000) through a cylinder mounting support (6011);
  a second hydraulic cylinder (6012), which is fixedly connected to the bearing table (6000), an adjusting lead screw (6013) is rotationally connected in the second hydraulic cylinder (6012), a fourth drive part is arranged on the adjusting lead screw (6013) and is used to drive the adjusting lead screw (6013) to rotate, an extrusion nut (6014) is connected to the adjusting lead screw (6013) through threads, hydraulic oil is provided in the second hydraulic cylinder (6012), and the second hydraulic cylinder (6012) is connected to the first hydraulic cylinder (6010) through a hydraulic oil connecting pipe (6015);
  a reel motor (6016), which is fixedly connected to the bearing table (6000), an output shaft key of the reel motor (6016) is connected to a first reel (6017) and a second reel (6018), and wires are wound on the first reel (6017) and the second reel (6018);
  two symmetrical hammering racks (602), which are connected to the bearing table (6000) in a sliding way, a circular table (6020) is fixedly connected to the hammering racks (602), a rack reset elastic part (6021) is fixedly connected to the circular table (6020), and one end of the rack reset elastic part (6021) away from the circular table (6020) is propped against the bearing table (6000);
  fixing wheels (6022), which are fixedly connected at one end of the hammering rack (602) located below the bearing table (6000), and one end of the wire (6019) away from the first reel (6017) and the second reel (6018) is respectively fixed on the two fixing wheels (6022);
  a hammering gear (6023) and a hammering cam (6024), which are coaxially and rotationally connected to the bearing table (6000), and the hammering gear (6023) is meshed with the hammering racks (6024).

2. The adjustable platform for installing the wind turbine generator according to claim 1, characterized in that the electric plug-in component comprises:
  a plug-in adjusting gear (301), which is rotationally connected in the adjustable platform shell (1), and a first drive part is arranged on the plug-in adjusting gear (301) and used to drive the plug-in adjusting gear (301) to rotate;
  two plug-in racks (302) arranged vertically, the plug-in racks (302) are connected to the inner wall of the adjustable platform shell (1) in a sliding way, the upper and lower sides of the plug-in adjusting gear (301) are respectively meshed with the plug-in racks (302), and one end of the plug-in racks (302) away from the plug-in adjusting gear (301) is used for plugging in the adjusting jacks (300).

3. The adjustable platform for installing the wind turbine generator according to claim 2, characterized in that a guide slide block (303) is arranged on the plug-in rack (302) and is connected to the inner wall of the adjustable platform shell (1) in a sliding way.

4. The adjustable platform for installing the wind turbine generator according to claim 1, characterized by also comprising:
a lifting adjusting gear (304), which is rotationally connected in the adjustable platform shell (1), and a second drive part is arranged on the lifting adjusting gear (304) and is used to drive the lifting adjusting gear (304) to rotate;
lifting adjusting teeth, which are arranged on the outer wall of the pile leg (3), and the lifting adjusting gear (304) is meshed with the lifting adjusting teeth.

5. The adjustable platform for installing the wind turbine generator according to claim 1, characterized in that the adjustable platform shell (1) is connected to the hull (2) through a buffer component (4).

6. The adjustable platform for installing the wind turbine generator according to claim 5, characterized in that the buffer component (4) comprises:
a guide rod mounting rack (400), which is fixedly connected to the hull (2);
a guide rod (401), which is fixedly connected to the guide rod mounting rack (400);
two symmetrical buffer execution components (402), the top of which is connected to the adjustable platform shell (1), and the bottom of which is connected to the hull (2).

7. The adjustable platform for installing the wind turbine generator according to claim 6, characterized in that the buffer execution component (402) comprises:
two symmetrical guide sleeves (4020), which are connected to the guide rod (401) in a sliding way, and an elastic buffer part (4029) is arranged between the two guide sleeves (4020) on the guide rod (401);
an upper linkage (4021), which comprises a first connecting rod (4022) and a second connecting rod (4023), the first connecting rod (4022) and the second connecting rod (4023) are respectively hinged at the upper ends of the two guide sleeves (4020), one end of the first connecting rod (4022) and the second connecting rod (4023) away from the guide sleeve (4020) is hinged on a connecting plate (4024), and the connecting plate (4024) is connected to the adjustable platform shell (1) through a bolt;
a lower linkage (4025), which comprises a third connecting rod (4026) and a fourth connecting rod (4027), and the third connecting rod (4026) and the fourth connecting rod (4027) are respectively hinged at the lower ends of the two guide sleeves (4020), one end of the third connecting rod (4026) and the fourth connecting rod (4027) away from the guide sleeve (4020) is hinged on a connecting block (4028), and the connecting block (4028) is fixed on the hull (2).

8. The adjustable platform for installing the wind turbine generator according to claim 1, characterized by also comprising a pile leg auxiliary mounting plug (5), a threaded connecting hole (500) is arranged on the pile leg auxiliary mounting plug (5), and the pile leg auxiliary mounting plug (5) is connected to the pile leg (3) through the threaded connecting hole (500);
the pile leg auxiliary mounting plug (5) comprises a driving component, a first firm component and a second firm component, and the driving component is used to drive the first firm component and the second firm component to work;

the driving component comprises:
a main drive gear (5000), a plurality of first meshing teeth (5001) are arranged on the main drive gear (5000), the main drive gear (5000) is radially connected to a pushing block (5002) along the radial direction in a sliding way, the pushing block (5002) is connected to the main drive gear (5000) through a first elastic reset part (5003), and a third drive part is arranged on the main drive gear (5000) and is used to drive the main drive gear (5000) to rotate;
the first firm component comprises:
a mounting cylinder (5004), which is fixedly connected in the pile leg auxiliary mounting plug (5);
a drive piston (5005), which is connected in the mounting cylinder (5004) in a sliding way, a plurality of pushing grooves (5006) are arranged at one end of the drive piston (5005) located outside the mounting cylinder (5004), the pushing block (5002) is used to fit with the pushing grooves (5006), a short rod (5007) is fixedly connected at one end of the drive piston (5005) located inside the mounting cylinder (5004), a first electromagnet (5008) is arranged on the drive piston (5005), and a second electromagnet (5009) is arranged on the inner wall of the mounting cylinder (5004) and is used to absorb the first electromagnet (5008);
a threaded stud (501), which is rotationally connected in the mounting cylinder (5004), a fit thread (5010) is arranged on the threaded stud (501), and one end of the short rod (5007) away from the drive piston (5005) is connected in the fit thread (5010) in a sliding way;
a threaded rod (5011), which is fixedly connected to the threaded stud (501), and a firm drill bit (5012) is sleeved outside the threaded rod (5011), and the threaded connection is adopted between the firm drill bit (5012) and the threaded rod (5011);
the second firm component comprises:
a rack guide base (5013), which is fixedly connected on the mounting cylinder (5004);
a meshing rack (5014), which is connected on the rack guide base (5013) in a sliding way, a plurality of groups of second meshing teeth (5015) are arranged on the meshing rack (5014), and the second meshing teeth (5015) are used to mesh with the first meshing teeth;
a reset elastic part mounting base (5018), which is fixedly connected to the meshing rack (5014), and a second reset elastic part mounting base (5019) is fixedly connected between the reset elastic part mounting base (5018) and the rack guide base (5013);
a positioning part (5017), which is connected in the pile leg auxiliary mounting plug (5) in a sliding way;
a power transmission part (5016), which is rotationally connected in the pile leg auxiliary mounting plug (5), one side of the power transmission part (5016) is used to fit with one end of the meshing rack (5014) away from the second meshing teeth (5015), and the other side of the power transmission part (5016) is used to hammer the positioning part (5017).

9. The adjustable platform for installing the wind turbine generator according to claim 1, characterized by also comprising a firm drill bit cleaning component (502), which comprises:
a water injection cylinder body (5020), which is fixedly connected on the mounting cylinder body (5004), a water inlet (5021) is arranged on the water injection cylinder body (5020), and a check valve is arranged on the water inlet (5021);

a pulling plunger (5022), which is connected in the water injection cylinder body (5020) in a sliding way, a connecting plate (5023) is fixedly connected at one end of the pulling plunger (5022) located outside the water injection cylinder body (5020), one end of the connecting plate (5023) away from the pulling plunger (5022) is fixedly connected on the meshing rack (5014), a guide column (5026) is fixedly connected to the connecting plate (5023), and one end of the guide column (5026) away from the connecting plate (5023) is connected in the rack guide base (5013) in a sliding way;

a flushing spray gun (5024), which is hinged on the mounting cylinder (5004), the inlet end of the flushing spray gun (5024) is connected to the water injection cylinder body (5020) through an outlet pipe (5025), and the outlet end of the flushing spray gun (5024) is oriented towards the firm drill bit (5012).

\* \* \* \* \*